Sept. 2, 1969     H. E. McCABE     3,464,287
REMOTE CONTROL ASSEMBLY
Filed Oct. 21, 1966
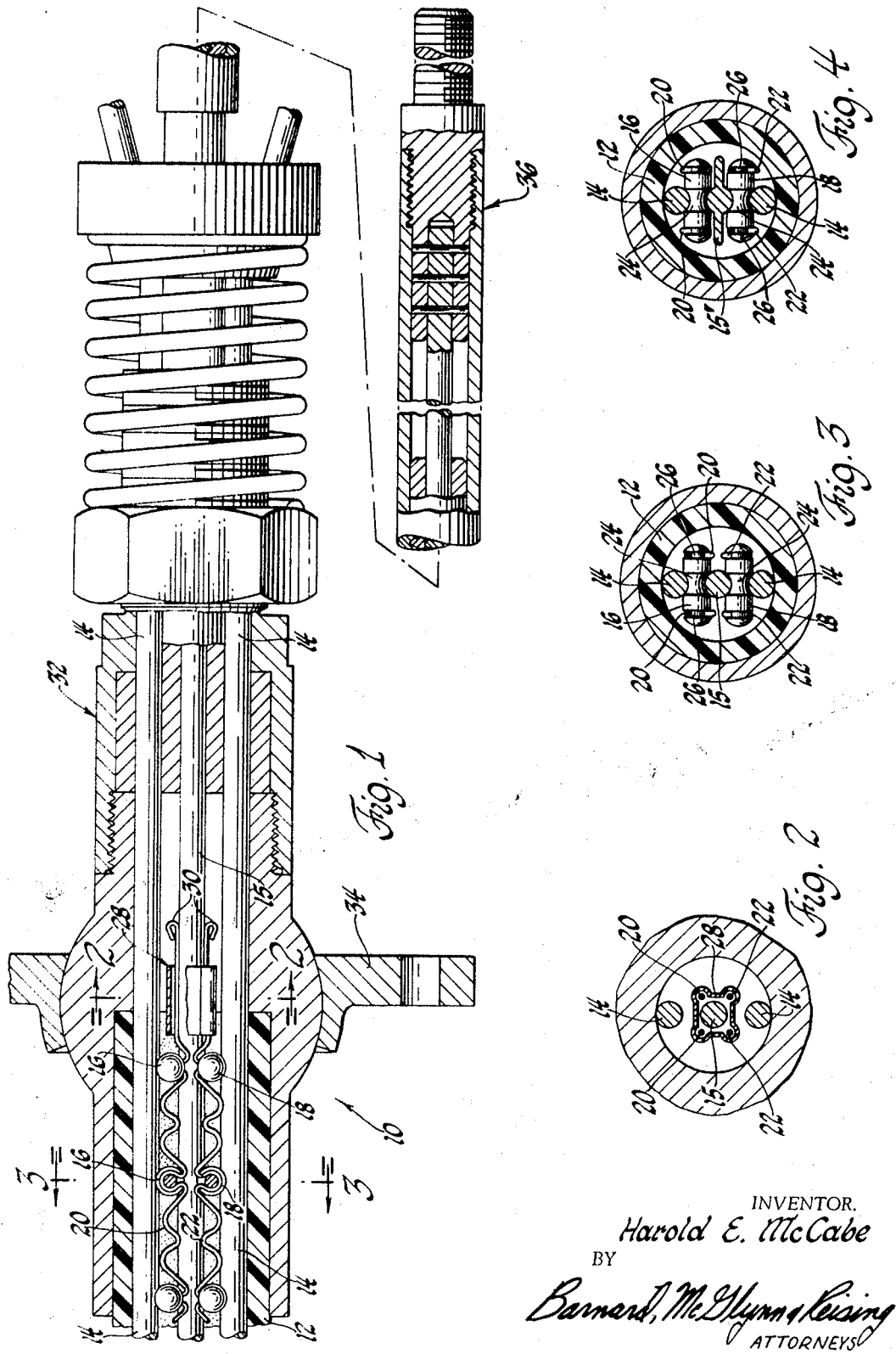
INVENTOR.
Harold E. McCabe
BY
Barnard, McGlynn & Reising
ATTORNEYS United States Patent Office 3,464,287
Patented Sept. 2, 1969

3,464,287
REMOTE CONTROL ASSEMBLY
Harold E. McCabe, Mahopac Falls, N.Y., assignor to Teleflex Incorporated, North Wales, Pa., a corporation of Delaware
Filed Oct. 21, 1966, Ser. No. 588,597
Int. Cl. F16c 1/10, 33/36, 33/46
U.S. Cl. 74—501
13 Claims

ABSTRACT OF THE DISCLOSURE

A motion transmitting remote control assembly utilizing roller elements in rolling engagement with a core element to facilitate movement of the core element translationally. A pair of tension bearing elements of circular cross section are provided which extend longitudinally of the motion transmitting remote control assembly to provide a track on which the roller elements move.

---

This invention relates to a motion transmitting remote control assembly which is normally operated to control a device by transmitting tension or compression in a curved path by means of a flexible core element. More specifically, this invention relates to a heavy-duty remote control assembly wherein high loads are transmitted over a long distance by a flexible core element which is movably supported within a conduit on roller elements to facilitate the movement thereof.

Remote control assemblies of the type to which the instant invention pertains are frequently utilized in aircraft to extend from the cockpit to a remotely positioned device in the aircraft and over a long tortuous path whereby the device may be actuated from the cockpit. Motion transmitting remote control assemblies of the type utilizing roller elements for supporting the motion transmitting core element are well known in the prior art. Many of the prior art assemblies, however, are quite complex and are, therefore, difficult and expensive to manufacture.

Accordingly, it is an object and feature of this invention to provide a motion transmitting remote control assembly utilizing roller elements in rolling engagement with the core element to facilitate movement of the core element and which is of a simplified and unique structure performing functions and overcoming disadvantages not heretofore possible with prior art devices.

In general, these and other objects and features of this invention may be attained in a remote control assembly which includes a conduit and a pair of tension bearing elements disposed in the conduit. Each of these elements has a substantially circular cross section and a motion transmitting core element is disposed within the conduit. A first plurality of roller elements are in rolling engagement with the core element and one of the tension bearing elements and a second plurality of roller elements are in rolling engagement with the core element and the other of the tension bearing elements. Each roller element is substantially cylindrical with a groove thereabout and rolling engagement with the core element and one of the tension bearing elements. In addition, each roller element has a recess thereabout adjacent each end. A pair of strips, comprising retainer means, is associated with each plurality of roller elements and each strip has a series of convolutions therealong to allow the strips to expand and contract. The roller elements are snapped in and rotatably retained in certain of the convolutions of one pair of the strips; that, is certain convolutions of the strips are disposed in the recesses adjacent the ends of each roller element.

Other objects and attendant advantages of the present invention will be readily appreciated as the same becomes better understood by reference to the following detailed description when considered in connection with the accompanying drawings wherein:

FIGURE 1 is a fragmentary cross-sectional view of a preferred embodiment of the instant invention;

FIGURE 2 is a fragmentary cross-sectional view taken substantially along line 2—2 of FIGURE 1;

FIGURE 3 is a cross-sectional view taken substantially along line 3—3 of FIGURE 1; and FIGURE 4 is a cross-sectional view similar to FIGURE 3 but showing an alternative embodiment of the instant invention.

Referring now to the drawings, wherein like numerals indicate like or corresponding parts throughout the several views, a motion transmitting remote control assembly constructed in accordance with the instant invention is generally shown at 10.

The remote control assembly 10 includes a conduit 12, and a pair of diametrically opposed first and second tension bearing elements 14 disposed within the conduit 12. There is also included a motion transmitting core element 15 which is movably disposed within the conduit 12. A first plurality of roller elements 16 are disposed between and in rolling engagement with one of the elements 14 and the core element 15. A second plurality of roller elements 18 are disposed between and in rolling engagement with the other element 14 and the core element 15. A first retainer means, which comprises the wire-like circular strips 20, interconnects the first plurality of roller elements 16 and a second retainer means, which comprises the wire-like circular strips 22, interconnects the second plurality of roller elements 18. The strips 20 and 22 are expandable and contractable due to the fact that they contain a plurality of convolutions.

It will be noted that each of the elements 14 has a substantially circular cross section and each of the roller elements 16 and 18 has a groove 24 extending thereabout for rolling engagement with elements 14 and the core element 15. Each of the roller elements 16 and 18 is substantially cylindrical with the grooves 24 being disposed about the mid-portion thereof. Also, each roller element has a recess 26 extending thereabout adjacent each end. The first pair of strips 20 includes convolutions therealong with certain of the convolutions disposed in the recesses of the roller element 16 so that the roller elements 16 are snapped into and rotatably retained in the strips 20. Likewise, the strips 22 have convolutions therealong with certain of the convolutions disposed in the recesses 26 of the roller elements 18 whereby the roller elements 18 are snapped into and rotatably retained in the strips 22. Thus, the strips 20 and 22 position the roller elements 16 and 18.

There is also included means, generally indicated at 28 for operatively interconnecting the first pair of strips 20 and the second pair of strips 22 for allowing the strips 20 and 22 to move a limited amount relative to one another. It will be noted that the strips 20 and 22 have loops 30 at the ends thereof to limit the movement thereof relative to each other and the means 28.

A means, generally shown at 32, prevents relative movement between the elements 14 in a direction longitudinally of the conduit 12 and is attached to the end of the conduit 12 and supported in the plate 34, or the like, which in turn may be secured to a support structure when the assembly is installed. The means 32 may take the form of a mere fitting attached to the end of the conduit by adhesion, swaging, crimping, or the like. The fitting may be crimped upon the conduit to prevent relative movement between the tension bearing elements 14 so that the elements 14 transmit reactive loads resulting from movement of the core element 15. The specific means 32 shown in the drawings, however selectively grips or clamps the elements 14 and is described and covered in applicant's copending applicaton Ser. No. 588,548, filed Oct. 21, 1966, and assigned to the assignee of the instant invention, and incorporated herein by this reference. It will be understood, therefore, that the instant invention is directed to the operative combination of the conduit 12, the elements 14, the motion transmitting core element 15, and the rollers 16 and 18 which are retained in position by the strips 20 and 22.

The core element 15 is attached to the slider member 36 which in turn is adapted to be secured to an element to be controlled or an element which moves the core element 15.

In FIGURE 4 there is disclosed an alternative embodiment having a core element 15' which, when viewed in cross section, includes a circular central portion and laterally extending portions disposed between the first and second plurality of roller elements.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A motion transmitting remote control assembly comprising: a conduit, a motion transmitting core element movably disposed in said conduit, a pair of diametrically opposed first and second elements disposed within said conduit, a first plurality of roller elements disposed between and in rolling engagement with said first element and said core element, a second plurality of roller elements disposed between and in rolling engagement with said second element and said core element, first retainer means interconnecting said first plurality of roller elements, and second retainer means interconnecting said second plurality of roller elements, at least one of said retainer means being expandable and contractable.

2. A motion transmitting remote control assembly as set forth in claim 1 wherein each of said elements is substantially circular in cross section and each of said roller elements has a groove thereabout for rolling engagement with said elements and said core element.

3. A motion transmitting remote control assembly as set forth in claim 2 wherein each of said roller elements is substantially cylindrical with said groove being disposed about the mid-portion thereof and including a recess thereabout adjacent each end thereof, said first retainer means comprising a first pair of strips having a plurality of convolutions therealong and disposed in said recesses of said first plurality of roller elements for positioning same, said second retainer means comprising a second pair of strips having a plurality of convolutions therealong and disposed in said recesses of said second plurality of roller elements for positioning same.

4. A motion transmitting remote control assembly as set forth in claim 3 wherein said core element as viewed in cross section includes a circular central portion and laterally extending portions disposed between said first and second plurality of roller elements.

5. A motion transmitting remote control assembly as set forth in claim 3 wherein said core element is substantially circular in cross section.

6. A motion transmitting remote control assembly as set forth in claim 3 including means operatively interconnecting said first and second pairs of strips for allowing said strips to move a limited amount relative to one another.

7. A motion transmitting remote control assembly as set forth in claim 6 including means for preventing relative movement between said elements in a direction longitudinally of said conduit.

8. A motion transmitting remote control assembly comprising: a conduit, a pair of tension bearing elements disposed in said conduit, each of said elements having a substantially circular cross section, a motion transmitting core element movably disposed in said conduit, a first plurality of roller elements in rolling engagement with said core element and one of said elements, and a second plurality of roller elements in rolling engagement with said core element and the other of said elements, each of said roller elements being substantially cylindrical with a groove thereabout for rolling engagement with said core element and one of said elements.

9. A motion transmitting remote control assembly as set forth in claim 8 wherein said core element is substantially circular in cross section.

10. A motion transmitting remote control assembly as set forth in claim 8 including means for preventing relative movement between said tension bearing elements in a direction longitudinally of said conduit.

11. A motion transmitting remote control assembly as set forth in claim 8 wherein said core element as viewed in cross section includes a circular central portion and laterally extending portions disposed between said first and second plurality of roller elements.

12. A motion transmitting remote control assembly comprising: a conduit means, a motion transmitting core element movably disposed in said conduit means, a plurality of roller elements disposed within and in contact with said conduit means and engaging said core element for facilitating movement of said core element relative to said conduit means, each of said roller elements having at least one recess thereabout which is spaced from the area of engagment thereof with said core element, and at least one integral retainer means interconnecting more than two of said roller elements by engaging said recesses thereof, said roller elements being snapped into and rotatably retained in said retainer means.

13. A motion transmitting remote control assembly as set forth in claim 12 wherein said retainer means comprises at least one strip having a plurality of convolutions with certain of said convolutions being disposed substantially about one of said roller elements in the recess thereof.

References Cited

UNITED STATES PATENTS

| | | | |
|---|---|---|---|
| 317,156 | 5/1885 | Lowrie | 308—6 |
| 417,340 | 12/1889 | Scales | 308—199 |
| 531,723 | 1/1895 | Hill | 308—6 |
| 560,281 | 5/1896 | Rauhoff | 308—613 X |
| 851,019 | 4/1907 | Model | 308—199 |
| 1,279,025 | 9/1918 | Shay | 308—201 |
| 2,406,209 | 8/1946 | Fausz | 74—502 X |
| 3,124,396 | 3/1964 | Barager | 308—200 |
| 3,154,966 | 11/1964 | Bratz | 74—501 |
| 3,230,979 | 1/1966 | Tenreiro | 64—3 X |
| 1,305,875 | 6/1919 | Bursell | 308—201 |
| 3,344,682 | 10/1967 | Bratz | 64—3 |
| 3,362,249 | 1/1968 | Richoux | 74—501 |

FOREIGN PATENTS 493,880  5/1919  France.

C. F. GREEN, Assistant Examiner

FRED C. MATTERN, JR., Primary Examiner

U.S. Cl. X.R.

64—2; 308—6, 217